United States Patent
Stevens

[15] 3,659,497
[45] May 2, 1972

[54] DRAINAGE FOIL RESURFACING MACHINE

[72] Inventor: Bruce W. Stevens, Appleton, Wis.
[73] Assignee: Menasha Corporation, Neenah, Wis.
[22] Filed: May 14, 1970
[21] Appl. No.: 37,151

[52] U.S. Cl. ................................. 90/17, 90/21 C, 308/3 A
[51] Int. Cl. ..................... B23c 1/12, B23c 9/00, B23c 3/00
[58] Field of Search ................. 90/17, 21, 21 A, 21 B, 21 C; 308/3 A

[56] References Cited

UNITED STATES PATENTS

| | | | |
|---|---|---|---|
| 3,326,032 | 6/1967 | Stuhldreher | 308/3 A |
| 2,435,849 | 2/1948 | Schlitters | 308/3 A |
| 2,506,958 | 5/1950 | Hallenbeck | 308/3 A |
| 2,256,559 | 9/1941 | Harder | 90/21 C |

FOREIGN PATENTS OR APPLICATIONS 581,285 10/1946 Great Britain ..................... 308/3 A Primary Examiner—Francis S. Husar
Attorney—Johnson, Dienner, Emrich, Verbeck & Wagner

[57] ABSTRACT

Apparatus for resurfacing upper surface portions of drainage foils which have lower longitudinally extending dovetail configurations or the like, including a support table having a guide fixture thereon adapted to cooperate with the lower dovetail portion of a foil in guiding relation therewith, an endless chain supported for cooperation with an end of a foil for effecting longitudinal movement thereof through the guide fixture, and a cutter head supported in overlying relation to the guide fixture and adjustable to selectively engage the upper surface of a foil during a resurfacing operation.

11 Claims, 6 Drawing Figures

Patented May 2, 1972
3,659,497
2 Sheets-Sheet 1
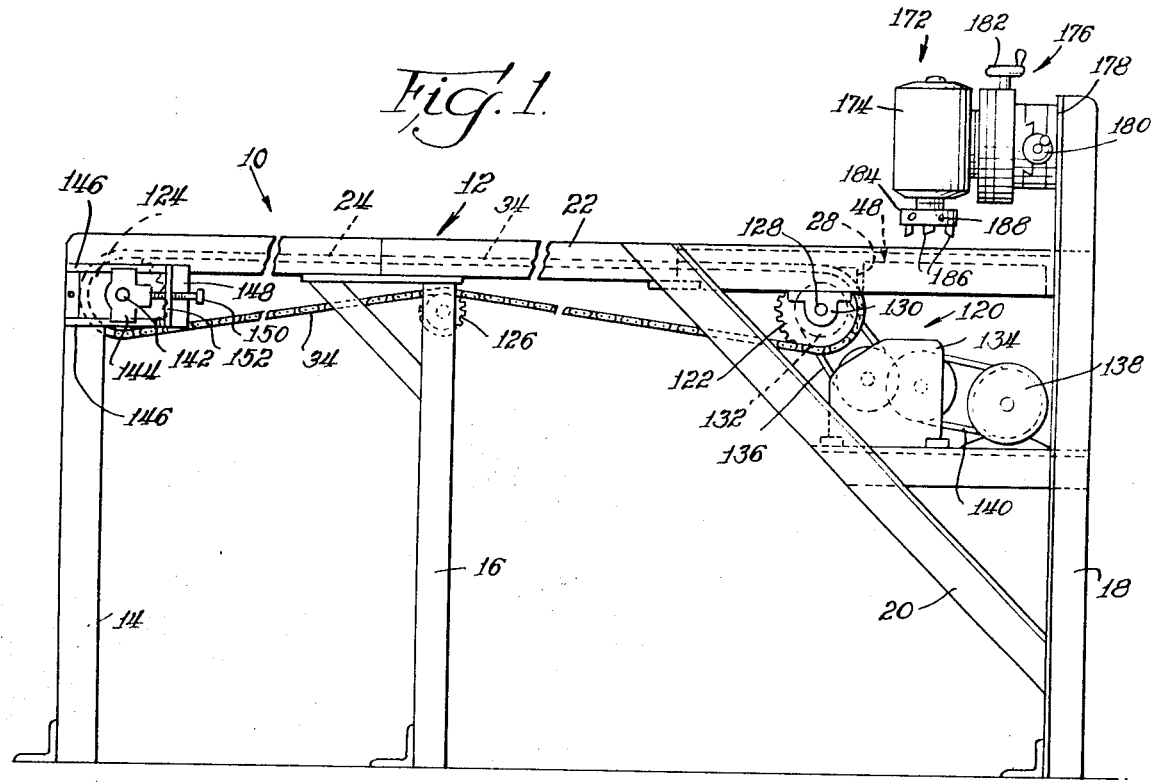
Fig. 1.
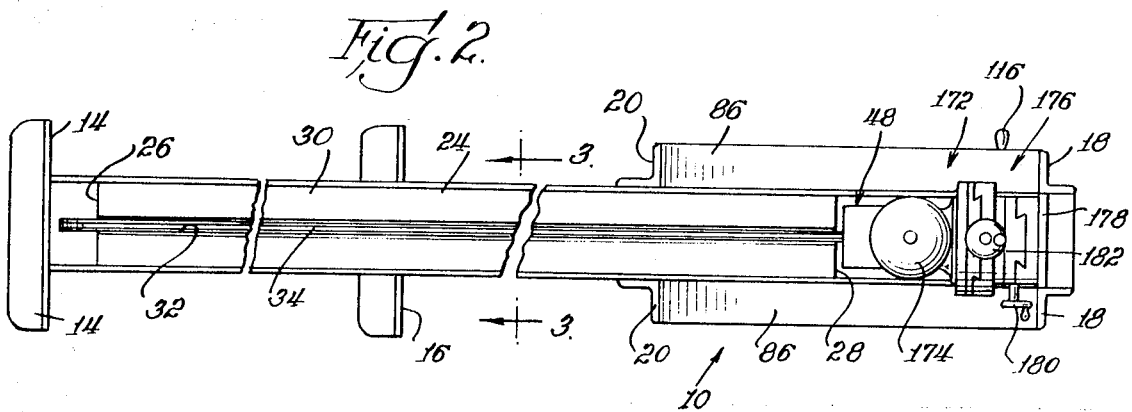
Fig. 2.
Fig. 3
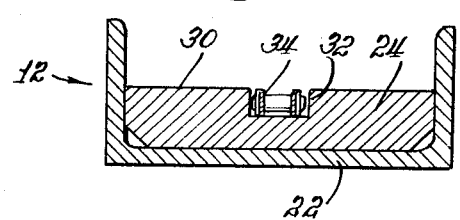
Inventor
Bruce W. Stevens
By
Johnson, Dienner, Emrich, Verbeck & Wagner
Att'ys Patented May 2, 1972

DRAINAGE FOIL RESURFACING MACHINE

BACKGROUND OF THE INVENTION

The present invention relates generally to resurfacing machines, and more particularly, to apparatus for resurfacing the upper surface portions of a drainage foil as used in Fourdrinier paper machines.

In paper making machines of the Fourdrinier type employing a moving endless wire screen which supports a suspension of fibers to be transformed into paper, it is conventional to provide means underlying the wire screen to effect drainage of water from the fiber suspension, leaving the fibers on the wire screen in the form of a continuous felted fiber mat. Such means conventionally comprises an elongated foil disposed in transverse relation to the direction of movement of the wire screen and having upper surface portions at least one of which is caused to engage the under surface of the screen. The upper surfaces of the foils are normally provided with a leading edge, a land surface which lies in a plane parallel to the direction of movement of the wire screen and engages the under surface thereof, and a trailing surface portion which diverges downwardly from the land surface portion and controls the amount of drainage from the fiber suspension. The lower longitudinal surfaces of the elongated foils are generally provided with transverse configurations which allow the foils to be readily secured to stationary support members. For example, the lower longitudinal surfaces of the foils may be of dovetail configuration, T-shaped configuration, or other known configuration allowing the foils to be readily retained on the stationary supports.

During operation of a Fourdrinier paper making machine with continued engagement of the upper surface of the drainage foil with the lower surface of the wire screen, the upper surfaces of the drainage foil, and particularly the land surface engaging the under surface of the wire screen, become worn. The existence of a trailing diverging surface and its angular relationship to the land surface portion of the foil is critical to the amount of drainage obtained from the fibers, it being desirable that drainage of water from the fiber stock be effected without excessive removal of the fibers or "fines" as they are known in the art. The present invention is directed to apparatus for resurfacing the upper surfaces of such drainage foils after they have become worn from use.

SUMMARY OF THE INVENTION

One of the primary objects of the present invention is to provide apparatus for resurfacing the upper surface portions of elongated drainage foils and the like after the surfaces become worn.

Another object of the present invention is to provide apparatus for resurfacing the upper surface portions of elongated drainage foils and the like, which apparatus includes a guide fixture adapted to cooperate with the lower dovetail portion of a foil in a manner to accommodate size variations in the foils while maintaining firm guiding engagement therewith.

Another object of the present invention is to provide a foil resurfacing machine as described employing a cutter head supported in overlying relation to the guide fixture, the cutter head being adjustable in a plane normal to the direction of foil travel through the guide fixture to resurface upper surface portions of the foil in selected angular relation.

A further object of the present invention is to provide a foil resurfacing machine as described including an endless chain disposed longitudinally of a base support, the endless chain being adapted for cooperation with the forward end of a foil for effecting longitudinal movement of the foil through the guide means during resurfacing of the upper surface portions thereof.

In carrying out the above objects and advantages of the present invention, a base support table is provided having a generally horizontal support surface along which a foil may be moved during resurfacing of the upper surfaces thereof. A guide fixture is positioned adjacent one end of the support table and is adapted to cooperate with the lower dovetail surface portions of foils to accommodate varying foil sizes while maintaining the foils in firm guiding relation as they are moved through the guide fixture. A movable endless chain is supported longitudinally of the support table and is cooperable with the forward end of a foil through releasible hook means to effect longitudinal movement of the foil through the guide means. A cutter head is supported to overlie the guide fixture and is angularly adjustable to selectively engage the upper surface portions of a foil for resurfacing the same as the foil is moved longitudinally through the guide fixture.

Further objects and advantages of my invention, together with the organization and manner of operation thereof, may best be understood by reference to the following description of a preferred embodiment of the invention when taken in conjunction with the accompanying drawings in which like reference numerals designate like parts throughout the several views.

BRIEF DESCRIPTION OF THE DRAWINGS

FIG. 1 is a foreshortened side elevational view of a foil resurfacing machine constructed in accordance with a preferred embodiment of the present invention;

FIG. 2 is a foreshortened top plan view of the foil resurfacing machine of FIG. 1;

FIG. 3 is a transverse sectional view taken substantially along the line 3—3 of FIG. 2, looking in the direction of the arrows;

DESCRIPTION OF A PREFERRED EMBODIMENT

Figure 4:
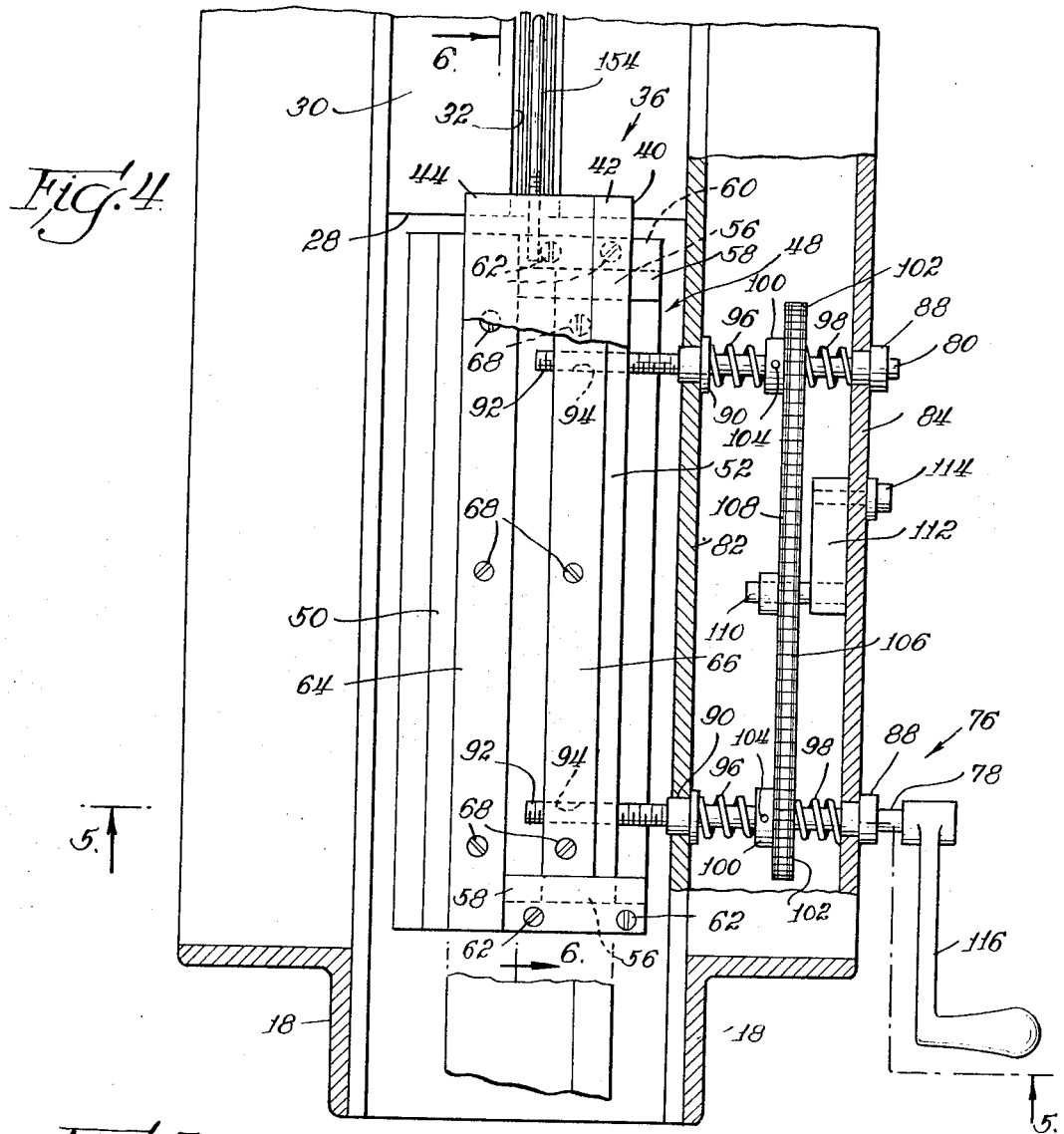
FIG. 4 is an enlarged partial top view of the foil guide fixture with a portion of the support table broken away to illustrate the adjustment elements for the movable portion of the fixture.

Referring now to the drawings, and in particular to FIGS. 1 and 2, a foil resurfacing machine in accordance with a preferred embodiment of the present invention is illustrated generally at reference numeral 10. The foil resurfacing machine 10 includes base support means comprising a generally horizontal elongated foil supporting table, indicated generally at 12. The table 12 is supported at a convenient operator height by a pair of vertical spaced support legs 14 affixed to one end of the support table, an intermediate pair of spaced support legs 16 secured to the support table generally intermediate its length, and a pair of spaced support legs 18 secured to the end of the support table opposite the end supported by legs 14. For purposes of explanation, the end of the support table 12 adjacent the support legs 18 will be termed the head or starting end of the foil resurfacing machine. A pair of inclined support struts 20 are suitably secured to the support legs 18 and the horizontal support table 12 to provide rigidity for the support table.

The horizontal support table 12 includes an elongated U-shaped channel 22 which has an elongated foil supporting block 24 suitably secured longitudinally therein between the upstanding sides of the channel. The foil supporting block 24 is generally rectangular in cross section and extends from a position generally adjacent the support legs 14 of the support table, as indicated by end 26 of the block, to a position spaced longitudinally from the support legs 18, as indicated by end 28. The foil supporting block 24 has an upper horizontal surface 30 having a rectangular slot or channel 32 formed therein which extends the full longitudinal length of the foil supporting block. As will be more fully described below, the channel 32 defines a guide path or track for an endless chain 34, the track 32 being formed along the central longitudinal axis of the foil supporting surface 30 of the foil supporting block 24. During operation, the foil supporting table 12 and its associated supporting block 24 serve to support an elongated foil, a portion of which is indicated generally at 36 in FIG. 4, as the foil is moved longitudinally along the support table 12 during resurfacing of the upper surface portions of the foil.

Noting FIGS. 4 and 5, the foil 36 is of the type used in Fourdrinier paper making machines to effect drainage from an endless wire screen carrying a suspension of fibers which are subsequently transformed into paper. When used in conjunction with a paper making machine, the foil 36 is supported in transverse relation to the direction of travel of the endless wire screen by a stationary support member. To this end the foil 36 has a lower surface portion comprising a dovetail configuration 38 extending longitudinally of the foil. The dovetail configuration 38 provides a means by which the foil 36 may be fixedly secured to a support member such that an upper longitudinally extending surface portion of the foil contacts the lower surface of the Fourdrinier wire screen and effects drainage therefrom in a known manner. It will be understood that the illustrated dovetail configuration 38 represents but one of a number of conventionally utilized configurations or shapes which the lower surface of the foil may be given. Thus, while the present invention will be described in conjunction with a foil 36 having a dovetail shaped lower surface, changes and modifications to accommodate foils having other lower surface configurations, such as T-shape, inverted dovetail, etc., are within the scope of the present invention.

Figure 5:
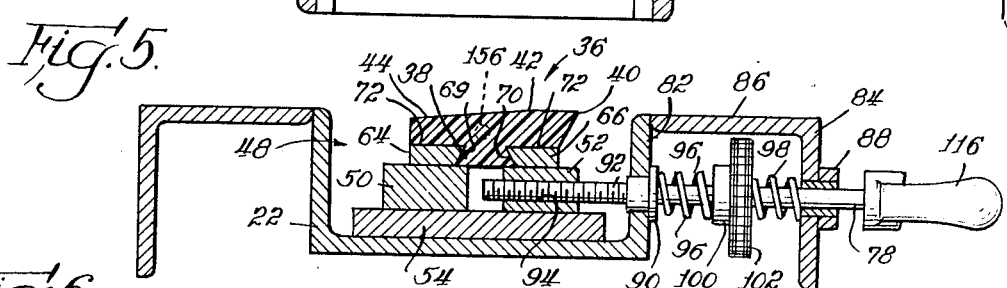
FIG. 5 is a transverse sectional view taken along line 5—5 of FIG. 4 looking in the direction of the arrows; end

The upper longitudinally extending surface of the foil 36 conventionally includes a leading edge portion indicated at 40 in FIG. 5, a generally horizontal land surface portion 42, and a trailing diverging surface portion 44. During use of the drainage foil 36 in conjunction with a Fourdrinier paper making machine, the land surface portion 42 of the foil is supported in parallel engaging relation with the lower surface of the endless wire screen carrying the fiber suspension. The angular relationship between the plane of the horizontal land surface portion 42 and the diverging trailing surface 44 of the foil is critical to the amount of fluid drained from the fiber suspension carried on the endless screen of the Fourdrinier machine, such angular relationship being generally held between approximately zero and five degrees relative to the plane of the horizontal land surface 42. Continued engagement of the land surface portion 42 of the drainage foil with the moving endless wire screen causes the land surface portion of the foil to become worn with a resulting change in the angular relation between the land surface portion and the trailing diverging surface 44. The trailing diverging surface 44 may also be worn during operation due to continued flow of drained fluid thereover. As noted above, the herein described foil resurfacing machine 10 provides means to resurface the upper surface portions 42 and 44 of the drainage foil 36 to obtain the desired surface area ratios and the desired angular relationship therebetween.

Figure 6:
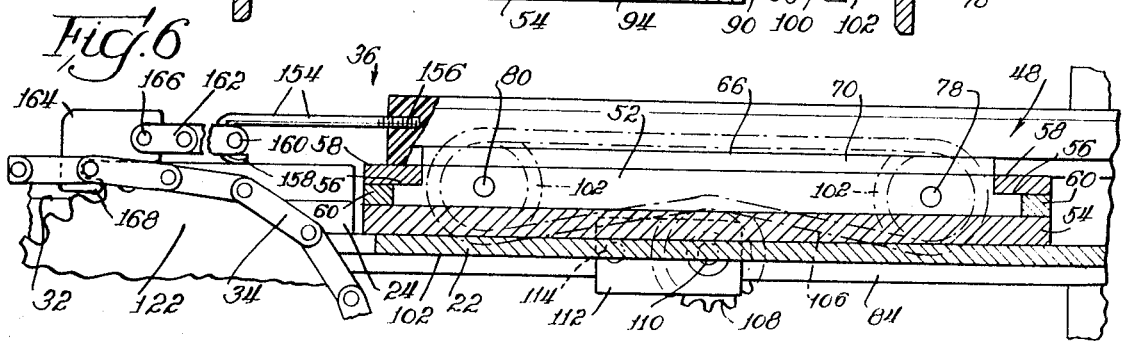
FIG. 6 is a partial longitudinal sectional view generally along the line 6—6 of FIG. 4, looking in the direction of the arrows.

The foil resurfacing machine 10 includes guide means, indicated generally at 48, supported by the foil supporting table 12 and adapted to cooperate with the lower dovetail portion 38 of a foil 36 in guiding relation therewith during longitudinal movement of the foil through the resurfacing machine. Noting FIGS. 4 and 5, taken in conjunction with FIG. 6, the guide means 48 includes a fixed mounting block 50 and a movable mounting block 52. The fixed mounting block 50 has a generally rectangular transverse cross sectional configuration and is secured to the upper surface of a planar base plate 54 which is fixed to the U-shaped channel 22 intermediate the upstanding side walls thereof as shown in FIG. 5. The movable mounting block 52 is supported on the upper surface of the base plate 54 for sliding movement thereon in a direction transverse to its longitudinal length. The movable mounting block 52 has a longitudinal length less than the longitudinal length of the fixed mounting block 50, as best seen in FIGS. 4 and 6, and has generally L-shaped opposite end portions defining shoulder surfaces 56. A hold down plate 58 is secured to each end of the base plate 54 in spaced relation above the upper surface of the base plate so as to slidingly engage a corresponding shoulder surface 56 on the movable mounting block 52 and limit upward movement thereof. Spacer bars 60 support the hold down plates 58 in such spaced relation above the base plate 54, the hold down plates 58 and associated spacer bars 60 being suitably secured to the upper surface of the base plate adjacent opposite ends thereof through mounting screws 62 as best illustrated in FIG. 4. In this manner, the movable mounting block 52 can be slidingly moved in a direction generally transverse to the longitudinal axis of the base plate 54.

A pair of cooperating foil guide bars 64 and 66 are suitably secured, as through spaced mounting screws 68, to the upper surfaces of the fixed and movable mounting blocks 50 and 52, respectively. The foil guide bars 64 and 66 along with their associated mounting blocks 50 and 52 are supported in parallel relation to the longitudinal axis of the support table 12. The guide bars 64 and 66 are cooperable with the dovetail surface portion 38 of a drainage foil 36 and retain the foil in generally fixed vertical position as it is moved longitudinally through the guide means 48 as will become more apparent hereinbelow. To this end, the foil guide bars 64 and 66 are provided with opposed inclined surface portions 69 and 70, respectively, which serve to engage corresponding surface portions of the dovetail 38 on the drainage foil 36. The guide bars 64 and 66 have upper surface portions 72 lying in a common horizontal plane and adapted to supportingly engage associated surfaces of the drainage foil 36 extending parallel to the dove tail portion 38.

The guide means 48 includes means for manually adjusting the position of the movable mounting block 52 relative to the fixed mounting block 50, which means is adapted to urge the movable mounting block against the cooperating dovetail portion 38 of a drainage foil 36. Such manual adjustment means is indicated generally at 76 and includes a pair of parallel spaced adjustment shafts 78 and 80. The adjustment shafts 78 and 80 are rotatably supported by an upstanding side portion 82 of the table channel 22 and a depending portion 84 of an L-shaped frame member 86 suitably secured to the upper edge portion of the upstanding side 82, as by welding, such that the depending portion 84 lies in a plane parallel to the plane of the upstanding side 82. The adjustment shafts 78 and 80 are rotatable in sleeve bearings or bushings 88 suitably retained within the depending portion 84 of the frame member 86, and bushings 90 each suitably retained within the upstanding side portion 82 of the channel 22 in axial alignment with one of the bushings 88. The adjustment shafts 78 and 80 are axially slidable within the associated pairs of support bushings 88 and 90 and have threaded end portions 92 adapted to be received within appropriate threaded openings 94 through the movable mounting block 52. The threaded openings 94 allow rotational movement of the adjustment shafts 78 and 80 with a corresponding movement of the movable mounting block 52 longitudinally along the adjustment shafts.

Means comprising opposed pairs of compression springs 96 and 98 are disposed about the respective adjustment shafts 78 and 80 and adapted to maintain the associated adjustment shafts in generally axial floating relation relative to the spaced frame portions 82 and 84. To this end, each of the compression springs 96 is disposed between a bushing 90 and a boss 100 formed integral with a sprocket 102, while each of the compression springs 98 is disposed between the depending portion 84 of the frame member 86 and one of the sprockets 102. The sprockets 102 are secured on the adjustment shafts 78 and 80 through screws 104 in the bosses 100 at positions generally midway along the portions of the shafts disposed between the frame portions 82 and 84, considered with adjustment shafts in positions as illustrated in FIGS. 4 and 5. With the sprockets 102 secured on the adjustment shafts 78 and 80 in this manner, the compression springs 96 and 98 are selected to maintain the sprockets in generally centered positions between the frame portions 82 and 84 when a foil is not retained within the guide means 48.

The sprockets 102 and their associated adjustment shafts 78 and 80 are connected for conjoint rotation through a conventional link chain 106 reeved over the sprockets in a known manner. Noting FIG. 6, an idler sprocket 108 is fixedly secured to a stub shaft 110 which is rotatably supported by and axially retained in an idler block 112. The idler block 112 is secured to the depending portion 84 of the frame member 86 through a machine screw 114 which allows the idler block 112 to be selectively moved in a manner to obtain the desired tension in the link chain 106. An operating handle 116 is fixedly secured to the outer end of the adjustment shaft 78 for manually rotating the adjustment shaft 78 with a corresponding rotational movement of the adjustment screw 80 through chain 106. In operation, when it is desired to retain a drainage foil 36 between the foil guide bars 64 and 66, the operating handle 116 is rotated to move the movable mounting block 52 to a position wherein the lower dovetail portion 38 of the drainage foil may be inserted between the foil guide bars 64 and 66. The operating handle 160 is then rotated to effect inward movement of the mounting block 52 until its foil guide bar 66 engages the cooperating surface of the dovetail portion of the drainage foil. Continued rotational movement of the operating handle 116 in a direction to urge the mounting block 52 against the foil dovetail portion 38 causes the adjustment shafts 78 and 80 to move axially outwardly relative to the movable block 52 with a corresponding compression of the compression springs 98. Thereafter, the movable mounting block 52 continues to be urged against the drainage foil dovetail portion 38 by the compression forces created in the compression springs 98. This arrangement substantially prevents an operator from moving the mounting block 52 against a drainage foil with a force sufficient to prevent movement of the foil longitudinally through the guide means 48.

Noting FIG. 1, taken in conjunction with FIG. 6, the foil resurfacing machine 10 includes means, indicated generally at 120, supported by the foil supporting table 12 for cooperation with a drainage foil 36 in a manner to effect longitudinal movement of the foil through the guide means 48. Such means 120 includes the aforementioned endless link chain 34 which is reeved over a drive sprocket 122 and an adjustable sprocket 124. The drive sprocket 122 is rotatably supported generally adjacent the left-most end of the guide means 48, and the adjustable sprocket 124 is supported generally adjacent the upstanding legs 14 of the foil supporting table 12. An idler pulley 126 is suitably rotatably supported by the support legs 16 so as to underlie the chain guide track 32 in the foil supporting block 24 in close proximity to the lower surface of the foil supporting table 12. The drive sprocket 122 is fixedly supported on a support shaft 128 which is rotatably supported in bearing support housings 130 secured to the lower surface of the table channel 22. The drive sprocket 122 is supported to project upwardly through appropriate openings in channel 22 and support block 24 such that the drive sprocket lies in a plane normal to the upper surface 30 of the foil supporting block, and causes the chain 34 to leave the drive sprocket in the horizontal plane of the chain track 32. A pulley 132 is also fixedly secured to the rotatable support channel 128 and is coupled in driving relation to an output pulley of a suitable speed reduction unit 134 through a conventional drive belt 136. The speed reduction unit 134 is coupled in driven relation to a drive motor 138 through a drive belt 140 in a known manner such that normal driving movement of the motor 138 effects rotational movement of the drive sprocket 122 in a counterclockwise direction, as considered in FIG. 1.

The chain sprocket 124 adjacent the upstanding support legs 14 is fixedly secured to a transversely disposed support shaft 142 which is rotatably supported within adjustable brackets 144 supported on opposite ends of the support shaft 142. The support brackets 144 are movable in longitudinal directions along vertically spaced outwardly directed guide rails 146 of support members 148 secured to opposite sides of the table channel 22 adjacent the associated support legs 14. A threaded adjustment screw 150 is operatively associated with each of the adjustable support brackets 144 and is threadedly engaged with an outwardly directed flange 152 formed integral with the associated support member 148 such that rotation of the adjustment screws 150 will cause horizontal movement of the support brackets 144 to take up slack in the link chain 34 as necessary. The sprocket 124 is supported to project upwardly within an opening in the table channel 22 so as to receive the chain 34 as it leaves the guide track 32. In this fashion, it will be understood that counterclockwise rotation of the drive sprocket 122 as described will effect a continuous movement of the endless chain 34 along the chain guide track 32 in the foil supporting block 24.

The means 120 for effecting longitudinal movement of a drainage foil 36 through the guide means 48 further includes means for coupling a forward end of a drainage foil to the endless chain 34. With reference to FIG. 6, such coupling or interconnecting means includes a coupling hook 154 having a threaded end portion 156 adapted to be threadedly secured axially within a forward end of a drainage foil 36. The coupling hook 154 further includes a hook end portion 158 adapted to releaseably received and retain a transverse link pin 160 of a length of link chain 162. The link chain 162 is of the No. 40 link size and comprises a relatively short length, such as approximately 9 inches, having a connecting hook 164 pivotally secured to a transverse link pin 166 opposite the link pin 160 cooperating with the coupling hook 154. The connecting hook 164 has a hook portion 168 defining a semi-circular recess adapted to receive a transverse link pin of the chain 34 therein in a manner to allow the hook member 164 to be coupled to the chain 34 selectively along its length, as desired. Preferably, the link chain 34 is also of the No. 40 size having individual links of twice the length of conventional chain links.

Referring to FIGS. 1 and 2, the foil resurfacing machine 10 includes cutter head means, indicated generally at 172, supported by the foil supporting table 12 in overlying relation to the foil guide means 48. The cutter head means 172 is adapted to effect resurfacing of the upper surface portions 42 and 44 of a drainage foil 36 during operation of the foil resurfacing machine. The cutter head means 172 includes an electric drive motor 174 supported on a conventional universal milling table fixture indicated generally at 176. The milling table fixture 176 is suitably supported on a cross plate 178 secured to and between the upper portions of the spaced support legs 18. The milling fixture 176 includes a first crank 180 for effecting horizontal movement of the cutter motor 174, and a second crank 182 for effecting vertical movement of the cutter head 172 in a known manner. The cutter drive motor 174 is also angularly positionable about a support axis of the milling fixture 176 parallel to the longitudinal axis of the support table 12 in a known manner, and is thereby angularly adjustable in a plane normal to the plane of the foil support table 12. The drive motor 74 has a cutter head 184 secured to the motor drive shaft for driving rotation therewith. The cutter head 184 releasably supports a plurality of downwardly depending cutter tools 186 which are secured to the cutter head through set screws 188 such that the axes of the cutter tools 186 are parallel to the drive shaft of the drive motor 174. In this fashion, it can be seen that rotational driving movement of the drive motor 174 will effect a corresponding rotational movement of the cutter head 184 with a resulting milling type cutting action of the cutters 186 when brought into engagement with an upper surface portion 42 or 44 of a drainage foil 36.

Having thus described the elements comprising a preferred embodiment of the foil resurfacing machine 10, its operation will now be briefly summarized. Preparatory to resurfacing the upper land surface 42 and trailing diverging drainage surface 44 of a drainage foil 36, a hole is drilled generally axially into an end of the drainage foil to receive the threaded end 156 of a coupling hook 154. The end of the drainage foil 36 having the coupling hook 154 secured therein is thereafter positioned such that the dovetail portion 38 is in cooperating relation with the foil guide bars 64 and 66 of the guide means 48, with the forward end of the drainage foil being disposed adjacent but not underlying the cutting head 184. Upon positioning the dovetail portion 38 of the drainage foil 36 between the guide bars 64 and 66 of the guide means 48, the operating handle 116 is rotated in a manner to cause firm engagement of the movable guide bar 66 against the associated dovetail surface of the drainage foil with a corresponding slight compression of the compression springs 98. The compression springs 98 thereafter urge the movable guide bar 66 against the dovetail portion 38 of the drainage foil to firmly retain the drainage foil within the guide means 48 while allowing longitudinal sliding movement thereof through the guide means. The cutter head 184 is then adjusted relative to the upper surface of the drainage foil to effect resurfacing of either the land surface portion 42 or the trailing diverging surface portion 44 of the drainage foil, it being understood that it is first desirable to resurface the land surface portion 42 prior to resurfacing the diverging surface portion 44.

With the cutter head 184 set in the desired cutting position, the coupling hook 154 is coupled to the transverse link pin 160 of the short length chain 162. The hook member 164 of chain 162 is thereafter coupled to a transverse link pin of the chain 34. As noted, the lengths of the coupling hook 154 and chain 162 are such that the hook 164 can be connected to the chain 34 when the forward end of the foil 36 is adjacent to but not underlying the cutter head 184. Thereafter, the cutter drive motor 174 is energized and the drive motor 138 for the endless chain 34 is energized to effect forward longitudinal movement of the drainage foil through the guide means 48 with resulting cutting or resurfacing of the selected upper surface portion of the drainage foil.

It will be understood that the longitudinal length of the foil resurfacing machine 10 is made long enough to effect complete resurfacing of a selected upper surface portion 42 or 44 of a drainage foil 36 upon a single pass of the drainage foil longitudinally through the foil resurfacing machine.

As noted above, the lower surface portions of drainage foils 36 as used in conjunction with Fourdrinier paper making machines and the like may have different configurations then the described dovetail configuration 38 to provide means for securing the foils to fixed support frames used with the paper making machines. As further noted, such lower surface configurations may take the form of T-shaped slots or inverted dovetail slots, in which case the guide bars 64 and 66 of the guide means 48 would be given cross sectional configurations sufficient to engage and maintain the drainage foils within the guide means 48 during longitudinal movement of the foils through the guide means during resurfacing of the upper surface portions of the foils. For example, if a drainage foil is provided with a T-shaped slot extending longitudinally along its lower surface, the foil guide bars 64 and 66 would be given configurations allowing them to be inserted upwardly within the T-shaped slot or groove and moved outwardly relative to each other to firmly engage the T-shaped slot and retain the foil within the guide means during longitudinal movement of the foil through the guide means. In the latter described configuration, the operating handle 116 would be rotated in a direction to move the foil guide bar 66 to its maximum inward direction, and thereafter rotate in an opposite direction to move the upper guide bar outwardly within the T-shaped slot until the desired guiding engagement is effected.

While I have described and illustrated a preferred embodiment of my invention, it will be obvious to those skilled in the art that changes and modifications may be made therein without departing from the invention in its broader aspects.

I claim:

1. Apparatus for resurfacing upper surface portions of drainage foils which have lower longitudinally extending generally dovetail transverse cross sectional configurations or the like for normally securing the foils to stationary support members, comprising, in combination, base support means having a generally elongated horizontal foil supporting surface, guide means supported by said base means and adapted to cooperate with the lower dovetail portion of a foil in guiding relation therewith, means supported by said base means for cooperation with a foil and adapted to effect longitudinal movement of the foil through said guide means, cutter head means supported by said base means in overlying relation to said guide means, said cutter head means being angularly adjustable and adapted to selectively engage and remove material from the upper surface of a foil during movement through said guide means, and means for actuating said cutter head means to effect resurfacing of the upper surface of the foil as it is moved longitudinally through said guide means.

2. Apparatus as defined in claim 1 wherein said guide means is supported adjacent one end of said base support means.

3. Apparatus as defined in claim 1 wherein said guide means includes a portion movable in a direction generally transverse to the direction of foil movement, and means urging said movable portion against the foil as the foil is moved longitudinally through said guide means.

4. Apparatus as defined in claim 1 wherein said guide means includes fixed and movable members supported in parallel relation to the longitudinal axis of said base support means, said fixed and movable members being adapted to cooperate with the lower dovetail portion of a foil disposed within said guide means to retain the foil in guiding relation therein.

5. Apparatus as defined in claim 4 wherein said guide means further includes means releasably urging said movable member against a foil moving longitudinally through said guide means.

6. Apparatus as defined in claim 4 wherein said guide means includes adjustment means operatively associated with said movable member and said base support means, said adjustment means being adapted to effect engagement of said movable member against a foil disposed within said guide means.

7. Apparatus as defined in claim 1 wherein said guide means is adapted to maintain the upper surface portions of a foil disposed therein in generally constant relation to said cutter head means, and wherein said means for effecting longitudinal movement of a foil through said guide means includes an endless chain supported longitudinally of the base support means, and means for releasably securing said endless chain to an end of the foil for effecting said longitudinal movement of the foil through said guide means.

8. Apparatus as defined in claim 1 wherein said cutter head means is angularly adjustable in a plane normal to the direction of movement of a foil through said guide means.

9. Apparatus as defined in claim 8 wherein said cutter head means is movable in a horizontal direction normal to the direction of travel of a foil through said guide means.

10. Apparatus as defined in claim 7 wherein said guide means includes fixed and movable members supported in parallel relation to the longitudinal axis of said base support means, said fixed and movable members cooperating with the lower dovetail portion of a foil in guiding relation therewith during movement of the foil through said guide means, said guide means further including means biasing said movable member against the foil during operation of the apparatus, and adjustable means cooperable with said movable member and adapted to effect selective movement of the movable member in a direction transverse to the direction of foil movement through the guide means notwithstanding said biasing means, and wherein said cutter head means is angularly adjustable in a plane normal to said foil supporting surface.

11. Apparatus for resurfacing a selected surface portion of a foil or the like which has a longitudinally extending surface portion of generally dovetail transverse cross sectional configuration or the like for normally retaining the foil on a stationary support member, comprising, in combination, base support means having a generally elongated foil supporting surface, guide means supported by said base means and adapted to cooperate with the retaining portion of a foil in guiding relation therewith, means supported by said base means for cooperation with a foil to effect longitudinal movement of the foil through said guide means, cutter head means supported by said base means in predetermined relation to said foil supporting surface, said cutter head means being adjustable to selectively engage and remove material from the selected surface portion of a foil during movement through said guide means, and means for actuating said cutter head means to effect resurfacing of the selected surface portion of the foil as it is moved longitudinally through said guide means.

* * * * *